(12) United States Patent
Kim et al.

(10) Patent No.: US 7,319,127 B2
(45) Date of Patent: Jan. 15, 2008

(54) NANO-SIZED METALS OR METAL SALTS STABILIZED BY USING CHAIN-END FUNCTIONALIZED POLYMERS AND THEIR SYNTHETIC METHODS

(75) Inventors: Jungahn Kim, Seoul (KR); Kwang Ung Kim, Seoul (KR); Seung Sang Hwang, Seoul (KR); Dong-Youn Shin, Seoul (KR); Jang Seop Kim, Seoul (KR); Soon-Geun Hwang, Anyang-si (KR); Keon Hyeong Kim, Seoul (KR)

(73) Assignees: Korea Institute of Science and Technology, Seoul (KR); Youl Chin Chemical Co., Ltd.

( * ) Notice: Subject to any disclaimer, the term of this patent is extended or adjusted under 35 U.S.C. 154(b) by 789 days.

(21) Appl. No.: 10/278,952

(22) Filed: Oct. 23, 2002

(65) Prior Publication Data
US 2004/0030019 A1   Feb. 12, 2004

(30) Foreign Application Priority Data
Aug. 10, 2002  (KR) .............................. 2002-47298

(51) Int. Cl.
*C08F 12/08*   (2006.01)
*B60C 1/00*    (2006.01)

(52) U.S. Cl. ...................... 526/346; 524/492; 524/430; 524/493; 524/497

(58) Field of Classification Search ................ 524/492, 524/430, 493, 497; 526/346
See application file for complete search history.

(56) References Cited

U.S. PATENT DOCUMENTS 4,252,677 A   2/1981   Smith 6,551,960 B1 *  4/2003  Laine et al. ............... 502/327
6,667,360 B1 * 12/2003  Ng et al. ................... 524/492
2003/0203282 A1 * 10/2003  Grugeon et al. ........ 429/231.95

FOREIGN PATENT DOCUMENTS

| EP | 0 864 362 A    | 9/1998 |
| EP | 0 864 362 A1 * | 9/1998 |
| JP | 10251548       | 9/1998 |
| JP | 2004002559 A   | 1/2004 |
| WO | 98/35248 A     | 8/1998 |

OTHER PUBLICATIONS

Bockstaller et al., Advanced Materials Dec. 2001, 13(32), 1783-1786.*
Antonietti M: "Snythesis and Characterization of Noble Metal Colloids In Block Copolymer Micelles" Advanced Materials, VCH Verlagsgesellschaft, Weinheim, DE, vol. 7, No. 12, Dec. 1, 1995, pp. 1000-1005, XP000547224.
M. Bockstaller et al., Advanced Materials 2001, 13(23), 1783-1786, XP001129593.

* cited by examiner

*Primary Examiner*—Robert D. Harlan
(74) *Attorney, Agent, or Firm*—Jones Day (57) ABSTRACT

Disclosed are nano-sized metals and metal salts stabilized by using semi-telechelic and telechelic polymers prepared through living anionic polymerization, and their synthetic methods, and a nanostructure wherein the nano-sized particles are self-assembled by mixing block copolymers and film-casting. The present invention provides a new method for preparing nano-sized particles capable of easily accomplishing nanostructure by merely mixing, especially with block copolymers, and having excellent stability.

6 Claims, 1 Drawing Sheet

NANO-SIZED METALS OR METAL SALTS STABILIZED BY USING CHAIN-END FUNCTIONALIZED POLYMERS AND THEIR SYNTHETIC METHODS

FIELD OF THE INVENTION

The present invention relates to nano-sized metals or metal salts stabilized by using semi-telechelic and telechelic polymers synthesized by living anionic polymerization, and their synthetic methods.

BACKGROUND OF THE INVENTION

Conventional nano-sized metal particles are synthesized by using electrolytes or emulsifiers such as dodecylthiol. General methods and requirements for synthesizing nano-sized transition metal particles are described in the literature in detail (*Langmuir*, vol. 13, pp. 639–646). Further, methods for preparation of functionalized polymers and telechelic polymers and their fields of application are well described in available literature (*Telechelic Polymers: Synthesis and Applications*, published in 1989).

Various methods for preparation of nano-sized metals and metal salts are known. The methods are roughly divided into the sol-gel process and the chemical vapor deposition (deposition in a gaseous state). Size, type and stability of nanoparticles are usually affected by the synthetic methodology. The sol-gel process in liquid medium may produce nano-sized particles directly in the liquid state; however, the stability of the synthesized particles is a significant problem. General ways to solve such problems are well described in the art (*Nanostructured Science and Technology: A Worldwide Study*, chapter 2, published in 1999). Specifically, the sol-gel processes using micelle or polymers having functionalized groups for controlling size and stability are described in *Angew. Chem. Int. Ed.* 2002, vol. 41, pp. 688–714; and *Science* 1992, vol. 257, pp. 219–223. However, a limitation of the materials used in these methods has led to a certain limited production of types of nano-sized metals.

SUMMARY OF THE INVENTION

It is, therefore, an objective of the present invention to provide new methods to prepare nano-sized metals and metal salts readily stabilized even in ambient air.

This invention relates to methods for synthesizing polymer-stabilized nano-sized metals or metal salts based on research in which chain-end functionalized polymers prepared through living anionic polymerization were found to be effective to readily stabilize nano-sized metals or metal salts.

Additionally, this invention relates to a method for stabilization of nano-sized metals or metal salts in polymeric matrices using semi-telechelic and/or telechelic polymers having molecular weight between 1,000 to 100,000 prepared by chain-end functionalization of living polymer.

Furthermore, the present invention provides nano-sized metal particles and their salts stabilized in air, wherein the metal particles and the salts exist within telechelic polymer matrices ($\alpha,\omega$-difunctionalized polymers) having molecular weights of 1,000 to 100,000.

BRIEF DESCRIPTION OF DRAWINGS

The above and other objects and features of the present invention will become apparent from the following description of the preferred examples given in conjunction with the accompanying drawings.

DETAILED DESCRIPTION OF THE PRESENT INVENTION

Preferred examples of the present invention will now be described.

The present invention is based on studies to accomplish the objective of the present invention and discovery that nano-sized metals and metal salts can be stabilized by using chain-end functionalized polymers, which are synthesized by living anionic polymerization.

Accordingly, the present invention relates to nano-sized metals and metal salts stabilized within a polymer matrix by using semi-telechelic and telechelic polymers synthesized by living anionic polymerization, and their synthesizing methods.

More particularly, the present invention relates to nano-sized metal particles and metal salts, stabilized in air and which are in a chain-end functionalized polymer matrix having molecular weights of 1,000 to 100,000 g/mol, selected from the group consisting of the following formulas 1 through 5, and methods for their synthesis.

wherein, $R_1$ and $R_2$ are hydrogen (H), methyl group ($-CH_3$), or t-butyl group ($-C(CH_3)_3$); $X_1$ and $Y_1$ are independently carboxyl group ($-COOH$), hydroxyl group ($-OH$), sulfonic acid group ($-SO_3H$), phthalic anhydride group ($-C_6H_3C_2O_3$) or thiol group ($-SH$); and, n is an integer of 10 to 5,000.

Formula 3

Formula 4 wherein, $R_3$ and $R_4$ are hydrogen (H) or methyl group (—$CH_3$); $X_2$ and $X_3$ are hydroxyl group (—OH), carboxyl group (—COOH), sulfonic acid group (—$SO_3H$), thiol group (—SH), amine group (—$NH_2$), tertiary amine group [—$N(R)_2$; R=methyl or ethyl group] or phthalic anhydride group (—$C_6H_3C_2O_3$); and m is an integer of 20 to 10,000.

Formula 5 wherein, $X_4$ is hydroxyl group (—OH), amine group (—$NH_2$) or tertiary amine group [—$N(R)_2$; R=methyl or ethyl group]; $Y_2$ is hydroxyl group (—OH), carboxyl group (—COOH), sulfonic acid group (—$SO_3H$), thiol group (—SH), amine group (—$NH_2$), tertiary amine group [—$N(R)_2$; R=methyl or ethyl group] or phthalic anhydride group (—$C_6H_3C_2O_3$); $A_1$ is a styrenic monomer; $B_1$ is methyl methacrylate (MMA), vinylpyridine, or diene monomer; and, o or p are integers of 10 to 5,000.

Further, the present invention relates to a method for preparing nano-sized metals and metal salts stabilized in a polymer matrix comprising the steps of providing a chain-end functionalized polymer of Formulas 1 to 5 having a molecular weight of 1,000 to 100,000; dissolving the polymers in a solvent; adding a metal salt solution to the resulting solution to make the molar ratio of polymer to metal salts having ratios of 1000:1 to 1:1; and adding a reducing agent to the solution mix.

The present invention provides nano-sized metal particles and their salts stabilized in air, wherein the metal particles and the salts exist within a matrix of telechelic polymers (α,ω-difunctionalized polymers) of the following Formula 6 having molecular weight of 1,000 to 100,000.

Formula 6 wherein, $A_2$ is a monomer such as styrenic monomer, MMA, vinylpyridine monomer or diene monomer; n is an integer of 10 to 5,000; and $X_5$ is hydroxyl group (—OH), carboxyl group (—COOH), amine group (—$NH_2$) or tertiary amine group [—$N(R)_2$; R=methyl or ethyl group], sulfonic acid group (—$SO_3H$), thiol group (—SH), or phthalic anhydride group (—$C_6H_3C_2O_3$).

Additionally, the present invention relates to a method for preparing nano-sized metals and metal salts stabilized in a polymer matrix comprising the steps of providing a difunctionalized telechelic polymer of Formula 6 having molecular weight of 1,000 to 100,000; dissolving the polymer in a solvent; adding a metal salt solution to the resulting solution to make the molar ratio of polymer:metal salts to be 1,000:1 to 1:1; and adding a reducing agent to the mixed solution.

The present invention provides a nanostructure wherein the nano-sized metal particles are self-assembled by mixing with block copolymers of the following Formula 7 or 8 wherein phase separation occurs, and the nano-sized metal particles are stabilized in air and exist within a matrix of chain-end functionalized polymers of Formulas 1 to 5 having molecular weight of 1,000 to 100,000.

Formula 7 wherein, $A_3$ is a styrenic monomer; $B_2$ is MMA, vinylpyridine monomer or diene monomer; m and n are each an integer of 10 to 5,000; $X_6$ is hydrogen (H), hydroxyl group (—OH), carboxyl group (—COOH), amine group (—$NH_2$) or tertiary amine group [—$N(R)_2$; R=methyl or ethyl group]; and $Y_3$ is hydroxyl group (—OH), carboxyl group (—COOH), sulfonic acid group (—$SO_3H$), thiol group (—SH), amine group (—$NH_2$), tertiary amine group [—$N(R)_2$; R=methyl or ethyl group], or phthalic anhydride group (—$C_6H_3C_2O_3$).

Formula 8 wherein, $A_4$, $B_3$ and C are different and are styrenic monomer, diene monomer, MMA or vinylpyridine monomer; k, m and n are each an integer of 10 to 5,000; $X_7$ and $Y_4$ are hydrogen (H), hydroxyl group (—OH), amine group (—NH$_2$) or tertiary amine group [—N(R)$_2$; R=methyl or ethyl group]; $Y_5$ is hydroxyl group (—OH), carboxyl group (—COOH), sulfonic acid group (—SO$_3$H), thiol group (—SH), amine group (—NH$_2$), tertiary amine group [—N(R)$_2$; R=methyl or ethyl group] or phthalic anhydride group (—C$_6$H$_3$C$_2$O$_3$).

Additionally, the present invention provides a nanostructure wherein the nano-sized metal particles are self-assembled by mixing with block copolymers of Formula 7 or 8 wherein phase separation occurs, the nano-sized metal particles being stabilized in air and existing within a matrix of telechelic polymers ($\alpha,\omega$-difunctionalized polymers) of Formula 6 having molecular weight of 1,000 to 100,000.

The nano-sized metal particles include, for example, Au, Ag, Pt (II), Pd (II), CdS, TiO$_2$, $\gamma$-Fe$_2$O$_3$ particles.

The molecular weight of the polymer synthesized by living anionic polymerization can be controlled and quantitative chain-end functionalizations of living polymers can be achieved. Thus, size and shape of transition metals can be controlled by using various types of functionalized polymers or block copolymers.

Further, as quantitative chain-end functionalization can be performed, the present invention has the advantage of selection of the kind of functional groups required for diverse application. The functional groups include hydroxyl group, sulfonic acid group, carboxyl group, thiol group, amine group, tertiary amine group [—N(R)$_2$; R is —CH$_3$ or —C$_2$H$_5$] and phthalic anhydride group. Detailed description on methods for preparing the functional groups are disclosed in *Comprehensive Polymer Science*, published in 1992, the first Supplement vol., chapter 5, pp. 83~106, and *Advances in Polymer Science*, published in 2000, vol. 153, pp. 68~162).

More particularly, the present invention can easily achieve nano-sizing of transition metals, e.g. Pd, Cu, Cd, Pt, Pb, Au, Ag and Fe and their salts, which are used as catalysts, semiconductor materials, and materials for data storage. The size of these metal particles are 1 nm~500 nm, preferably 1 nm ~50 nm.

Another advantage of the present invention is that microdevices can be easily manufactured as the nano-sized metal particles stabilized by the chain-end functionalized (semi-telechelic or telechelic) polymers are mixed in organic solvents with various types of self-assembled block copolymers to easily become a nanostructure.

As telechelic or semi-telechelic polymers-coated nano-sized particles can be easily nanostructured by mixing with self-assembled block copolymers, the nano-sized metals and metal salts synthesized according to the present invention can be assembled three-dimensionally within a polymer matrix. It is thus possible to form a nano-pattern through the calcination of the polymer matrix in actual uses.

Monomers which can be used in the chain-end functionalized polymers of the present invention include styrene and its derivatives, diene monomers, and acrylates, the general formulas of which are as follows:

styrenic monomer:

diene monomer:

acrylic monomer:

wherein, $R^1$, $R^3$ and $R^4$ are hydrogen (H) or methyl group (—CH$_3$); $R^2$ is hydrogen (H), methyl group (—CH$_3$), t-butyl group (—C(CH$_3$)$_3$), silyloxy group [—OSi(CH$_3$)$_2$(t-Bu)], amine group protected by silyl group [—N(Si(CH$_3$)$_3$)$_2$]; $R^5$ is hydrogen, methyl group (—CH$_3$) or hydroxyethyl group (—CH$_2$CH$_2$OH); and X' is H, —N(CH$_3$)$_2$, —N(Si(CH$_3$)$_3$)$_2$ or —OSi(t-Bu(CH$_3$)$_2$).

General shapes of the chain-end functionalized polymers used in the present invention are as follows.

Semi-telechelic polymers

Telechelic polymers wherein, X and Y are identical or different from each other, and they are carboxyl group (—COOH), hydroxyl group (—OH), sulfonic acid group (—SO$_3$H), amine group (—NH$_2$), t-amine group [—N(R)$_2$; R=—CH$_3$ or —C$_2$H$_5$] or thiol group (—SH).

The polymerization initiator includes alkyl lithium, for example, n-butyllithium, sec-butyllithium, t-butyllithium, diisopropylaminolithium; alkyl alkali metal and alkyl alkoxide alkali metal wherein lithium is replaced with alkali metals such as Na, K, Cs and Rb. And, the solvents include a nonpolar paraffinic solvent such as pentane, hexane or heptane, an aromatic solvent such as cyclohexane, benzene or toluene, tetrahydrofuran, and a mixed solution of a polar solvent and a nonpolar solvent of the paraffin type, wherein the volume ratio of nonpolar solvent:polar solvent is 90:10~97:3. The living polymerizations in the solvents are well described in the literature (*Anionic Polymerization: Principles and Practical Applications* by Marcel Dekker, published in 1996).

The functionalized polymers, i.e. semi-telechelic polymers and telechelic polymers, are synthesized by reacting CO$_2$, ethylene oxide, sultone (for example, 1,3-propanesultone or 1,4-butanesultone), ethylene sulfide or propylene sulfide, or trimellitic anhydride chloride and the like with the living polymers synthesized by using the aforementioned initiators or catalysts, or by using monomers such as styrene derivative or diphenylethylene derivative having protected functional groups, under high vacuum. General formulas of these monomers are as follows.

wherein, R$^6$ includes hydrogen (H) or methyl group, and X″ includes oxazoline, dimethylamino, silyloxy, bis(trimethylsilyl)amino group.

Under high vacuum state, for instance, living polymers manufactured by polymerizing styrene having protected reactive group in 100 ml of tetrahydrofuran using sec-butyllithium (sec-BuLi; $1.0 \times 10^{-4}$ mol) as an initiator for 6 hours at temperature of −78° C., are reacted with $1.2 \times 10^{-4}$ mol of pre-purified 1,1-diphenylethylene for 4 hours, and again reacted with $2.0 \times 10^{-4}$ mol of 1,3-propanesultone for 24 hours at room temperature, thereby obtaining a semi-telechelic polymer having quantitatively chain-end sulfonic acid group. The molecular weight of the manufactured polymer can be controlled by the amount of monomers to be polymerized. Yield of the obtained polymer can be analyzed by $^1$H NMR spectrum, which is described in the literature (*Macromolecules* by R. P. Quirk and J. Kim, 25, 4515 published in 1991).

The semi-telechelic and telechelic polymers used in the present invention include polystyrene, polybutadiene, isoprene, polystyrene derivatives, polymethyl methacrylate (PMMA) and poly(vinylpyridine) [poly(4-vinylpyridine) or poly(2-vinylpyridine)], and the appropriate molecular weight of the polymers is 500~200,000, preferably, 1,000~50,000 and their concentration in use is 0.01~5.0 g/10 ml.

The concentration of the transition metal salts used for manufacturing the nano-sized metals and metal salts in the present invention is in the range of 0.01~10 g/10 ml, and the reaction temperature of −78° C.~70° C., preferably 10° C.~50° C., and NaBH$_4$, H$_2$S and Na$_2$S etc., can be used as a reducing agent.

The present invention is explained in detail through the examples given below. However, the examples presented here are for illustrative purposes only and should not be construed as limiting the invention.

EXAMPLE 1

Under high vacuum, 500 ml of benzene was first distilled into 1 liter of a round-bottom Pyrex flask containing $9.07 \times 10^{-3}$ mol of sec-BuLi delivered by using a syringe under argon gas, followed by delivering 20 ml of a purified styrene into the reactor and polymerizing at 25° C. for 24 hours. The molecular weight of the resulting polystyrene was 2,000 g/mol. Purified ethylene oxide of 10 times excess molar ratio over poly(styryl)lithium was added under vacuum and reacted for 24 h. The functionalization yield of chain-end hydroxylation of poly(styryl)lithium was over 99 mol %.

After tetrahydrofuran of molar ratio of 5 times over poly(styryl)lithium synthesized by the same manner as the above process was delivered into the reactor by the fractional distillation, 1,1-diphenylethylene purified prior to the use was added thereto with molar ratio of 2 times over the poly(styryl)lithium and reacted for 5 hours. Subsequently, CO$_2$ gas of 99.99% was delivered to the reactor. The yield of chain-end carboxylation was over 99 mol %.

Chain-end sulfonation of poly(styryl)lithium was performed by adding 1,3-propanesultone of molar ratio of 3 times over the living polymer capped with 1,1-diphenylethylene instead of CO$_2$ gas. Again, terminally thiolated polymers having chain-end thiol group were prepared by adding propylene sulfide of molar ratio of 3 times over the poly(styryl)lithium.

Each of 5 g of the functionalized polymers as manufactured above was dissolved in 100 ml of tetrahydrofuran in a 1 L of beaker, and hydrochloric acid/tetarhydrofuran (1 N solution) was added to react for 24 hours with stirring so that lithium ion on the functionalized polymers were replaced with hydrogen group.

The reaction of terminally hydroxylated polymer with trimellitic anhydride chloride of 3 times molar ratio thereto under high vacuum at 30° C. for 24 hours produced terminally anhydride-functionalized polymer.

The molecular weights of the manufactured functionalized polymers were 500~100,000 g/mol on the basis of the result by gel permeation chromatographic analysis, and the functionalization yield was not less than 99 mol % on the basis of the result by $^1$H NMR analysis.

EXAMPLE 2

According to a method analogous to the method in Example 1, using lithium naphthalenide ($1.0 \times 10^{-2}$ mol) as an electron transfer catalyst, 10 g of styrene monomer was polymerized in 100 ml of a mixture of benzene/tetrahydrofuran (volume ratio: 95/5) at 25° C. for 24 hours. The molecular weight of the resulting living polystyrene was 2,000 g/mol. The reaction of $4.0 \times 10^{-2}$ mol of ethylene oxide with the resulting living polymer for 24 hours produced the corresponding α,ω-dilithium poly(styrene) dihydroxylate, i.e., telechelic polymer having hydroxyl groups at both chain ends.

According to the same method as in Example 1, each of telechelic polystyrene having a carboxyl group, a sulfonic acid group or a thiol group was synthesized. Lithium counter-ion of the manufactured telechelic polymer was replaced with hydrogen in the same manner as in Example 1. By controlling the ratio of the amount of styrene to the concentration of lithium naphthalenide, the molecular weights of the polymers were controlled in the range of 500~100,000. Chain-end functionalization was then performed by following the same procedures as those in Example 1. The functionalization yield of the polymers was not less than 98 mol %.

EXAMPLE 3

According to the same method as in Example 1, poly(butadienyl)lithium was synthesized, followed by functionalizations using the above terminating agents resulting in the production of chain-end functionalized polymers having hydroxyl group, carboxyl group, sulfonic acid group, and thiol groups.

According to the same method as in Example 2, styrene of molar ratio of 4 times over lithium naphthalenide was first put in 1 L of a reactor to generate a real initiator in 400 mL of benezene. Butadiene purified over n-bultyllithium at −78° C. was then delivered into the reactor after 4 hours, followed by polymerization at 25° C. for 24 h. Thereafter, telechelic polymers were synthesized by following the same procedures as in Example 2. The control of the ratio of the amount of-butadiene to the concentration of lithium naphthalenide made the molecular weights of the resulting polymers in the range of 1,000~200,000 g/mol. Functionalization was performed according to the same method as in Example 1. The functionalization yield for synthesis of telechelic polymers was not less than 98 mol %.

EXAMPLE 4

Each of 1,1-diphenylethylene derivatives of 4,4'-bis[(dimethyl)amino]phenylethylene, 4,4'-bis[di[(trimethylsilyl)]amino]phenylethylene, 1-[4-bis(trimethylsilyl)amino]phenyl-1-phenylethylene, 1-(4-dimethylamino)phenyl-1-phenylethylene, 4,4'-bis[(t-butyldimethyl)silyloxy]phenylethylene, 1-[(t-butyldimethyl)silyloxy]phenyl-1-phenylethylene with 2 molar excess over the concentration of living polymer was dissolved in tetrahydrofuran under high vacuum, respectively, and each solution was then added to the living poly(styryl)lithium solution manufactured according to the same method as in Example 1. The reaction was performed at room temperature for 24 h with stirring.

The reaction was terminated by adding degassed methanol. The removal of the silane protecting group with an excessive amount of concentrated sulfuric acid (2 N solution)/tetrahydrofuran solution was carried out. The molecular weights of the resulting polymers were also controlled in the range of 1,000~200,000 g/mol and the functionalization yield was over 99.5 mol %.

EXAMPLE 5

According to the same method as in Example 4, the diphenylethylene derivatives of Example 4 were added in the living polymer solution synthesized by the same procedures as in Example 2. The functional group was hydrogenated by following the same procedures as in Example 4 and the molecular weights of the polymers were 1,000~200,000. The functionalization yield was over 99 mol %.

EXAMPLE 6

Poly(styrene-b-methy methacrylate), poly(styrene-b-butadiene-b-methyl methacrylate), poly(styrene-b-4-vinylpyridine), and poly(styrene-b-2-vinylpyridine) were prepared via sec-butyllithium-initiated block copolymerizations in different reaction conditions, respectively. Each block composition was controlled as 75:25, 50:50 and 25:75 for diblock copolymers, respectively, and 75:50:25 for triblock copolymer. The total molecular weights of the polymers were controlled in the range of 20,000~500,000 g/mol.

EXAMPLE 7

In order to synthesize block copolymers functional groups shown in Formula 8 the same procedures as in Example 6 were followed. One of the diphenylethylene derivatives mentioned in Example 4 was introduced into the living polymer solution obtained, followed by polymerizing the second monomer sequentially and adding the other derivative. Next, the third monomer was delivered into the reactor containing living block copolymer and polymerized in a proper solvent system for at least 5 h. As an example, for poly(styrene-b-butadiene-b-methyl methacrylate), sec-butyllithium-initiated block, copolymerization was carried out in THF at −78° C. for 24 h. The reaction was terminated with degassed methanol, and followed by deprotection of the silane group using an excess amount of concentrated sulfuric acid (2 N)/tetrahydrofuran solution. The total molecular weight of the block polymers was usually controlled within 20,000~500,000 g/mol.

EXAMPLE 8

0.1 g of each functionalized polymer prepared in Example 1 carrying hydroxyl, carboxylic acid, sulfonic acid, and thiol group at the chain end, was dissolved in 10 ml of a mixture of toluene/methanol (80/20, v/v) using 50 mL vials. Thereafter, the air was replaced with argon gas. 1 gram of cadmium acetate dihydrate [$(CH_3CO_2)_2Cd \cdot 2H_2O$] was also dissolved in 10 ml of toluene/methanol (volume ratio of 80/20) in the vial. Thereafter, the air was replaced with argon gas. 1.7 ml of the cadmium salts solution was taken from the vial, followed by delivering it into the polymer solution in each vial and mixed with stirring for 2 h.

About 40 ml of hydrogen sulfide ($H_2S$) was injected by using a syringe to the solution in each vial and the vials were kept at room temperature for at least 4 h with stirring. The color of the solution in each vial changed from light yellow to orange. Brown or orange powders were obtained by precipitation of the reactants in an excess amount of methanol. The size of cadmium sulfide (CdS) in each powder was in the range of 5 nm~30 nm on the basis of the photographs by transmission electron microscopy (TEM). The polymer-coated CdS nanoparticles in the polymer were stable for more than 3 months in ambient air, and were easily dissolved in benzene, toluene or tetrahydrofuran.

EXAMPLE 9

Each polymer (0.1 g) synthesized in Example 2 with molecular weight of 2,500 g/mol, and having hydroxyl group, carboxyl group, sulfonic acid group and thiol group was dissolved in 10 mL of the mixture of toluene/methanol (80/20, v/v) in 50 mL vials analogous to those in Example 8 at room temperature. Thereafter, the air was replaced with argon gas. One gram of cadmium acetate dihydrate [(CH$_3$CO$_2$)$_2$Cd·2H$_2$O] was also dissolved in 10 ml of the toluene/methanol mixture (volume ratio of 80/20) in each 50 mL vial. Thereafter, the air was replaced with argon gas. 1.7 ml of the cadmium salts solution was added to the polymer solution in each vial and mixed with stirring for 2 h.

Afterwards, about 40 ml of hydrogen sulfide (H$_2$S) at atmospheric pressure was taken by using a syringe, followed by delivery to the solutions in each vial and reacting for 4 h. The color of the solution in each vial changed from light yellow to orange. Brown or orange powders were also obtained by precipitation of the reaction solution in an excess amount of methanol and filtration. The size of cadmium sulfide (CdS) in each powder was 5 nm~30 nm.

Figure 1:
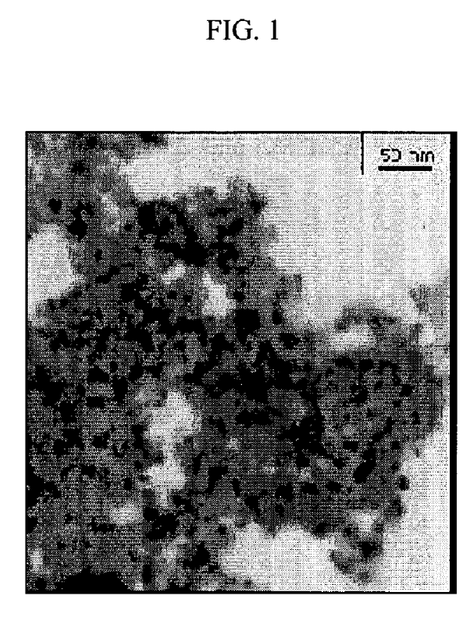
FIG. 1 is an electron micrograph of telechelic polymers having chain-end hydroxyl groups containing CdS particles, as synthesized in Example 9.

FIG. 1 is a typical TEM photograph of the CdS nanoparticles stabilized by telechelic polymers having hydroxyl groups at both chain ends, as synthesized above.

Figure 2:
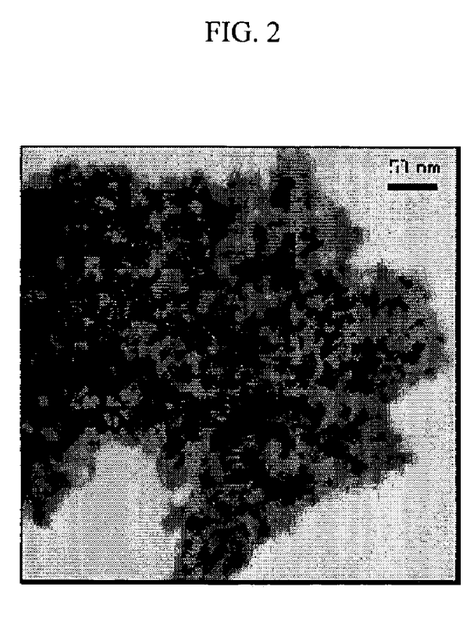
FIG. 2 is an electron micrograph of telechelic polymers having chain-end sulfonic acid groups containing CdS particles, as synthesized in Example 9.

FIG. 2 represents a typical TEM photograph of the CdS nanoparticles stabilized by telechelic polymers having sulfonic acid group at both chain ends, as synthesized above.

EXAMPLE 10

0.1 g of functionalized polybutadiene having molecular weight 2,800 g/mol manufactured in Example 3 was used for preparation of nano-sized CdS particles by following the same procedures as described in Example 8. The particle size of the obtained CdS was in the range of 3 nm~20 nm.

EXAMPLE 11

0.1 g of telechelic polymer having a molecular weight of 3,500 g/mol manufactured in Example 4 was also used for preparation of nano-sized CdS particles by following the same procedures as described in Example 9. As a result, nano-sized CdS particles having size of 5 nm~30 nm were obtained.

EXAMPLE 12

0.1 g of chain-end functionalized polymer having molecular weight of 2,800 g/mol prepared in Example 4 was also used for preparation of polymer-stabilized CdS particles by following the same procedures as described in Example 9. The size of the resulting CdS particles exhibited 10 nm ~35 nm.

EXAMPLE 13

Each chain-end functionalized polymer (0.1 g) synthesized from Examples 1 and 2 was dissolved in 10 ml of the mixture of methanol/toluene (10/90, v/v) in a vial. Again, 1.0 g of lead (II) acetate trihydrate [(CH$_3$CO$_2$)$_2$Pb·3H$_2$O] was dissolved in 10 ml of the mixture of toluene/methanol. The synthesis of nano-sized PbS particles was conducted by following the same procedures as described in Example 9. The color of the solution was orange and the size of particles in each mixed solution was in the range of 5 nm~25 nm.

EXAMPLE 14

0.1 g of telechelic polymer of molecular weight of 2,200 having sulfonic acid groups at both chain ends manufactured in Example 2, was dissolved in a mixture of methanol/distilled water (20/80, v/v) using a 50 mL vial, followed by adding 2 g of FeCl$_2$·4H$_2$O. The air in the vial was replaced with argon gas and then 5 ml of sodium hydroxide solution (12.5 N) was added with stirring. The color of this mixture in the vial was light green. The vial was heated at temperature of about 60° C., and 2 to 10 ml of hydrogen peroxide was added with stirring and reacted for 5 h. The solution was precipitated in an excess amount of n-pentane leading to the production of polymer powder. The size of γ-Fe$_2$O$_3$ particles in the polymers was in the range of 5 nm~15 run.

EXAMPLE 15

Each telechelic polymer (25 g (0.01 mol)) of the molecular weight of 2,500 g/mol having hydroxyl group, carboxyl group, and sulfonic acid group as manufactured in Example 2 was dissolved respectively in 100 ml of a mixture of distilled water/tetrahydrofuran (70/30, v/v) within a 500 ml Pyrex flask. 0.0043 g (1.0×10$^{-5}$ mol) of potassium tetrachloroplatinate (II) (K$_2$PtCl$_4$; 98%) was then added, followed by stirring of the solution under argon stream for 30 min. After injecting hydrogen gas (purity: 99%) in the rate of 20 ml/min for 5 min, the reaction vessel stood for 24 h after blocking the vessel with a rubber septa. Then, the reaction solutions were precipitated in n-pentane to obtain yellow powder. Bivalent platinum ions [Pt(II)] having the size of 5 nm~30 nm were prepared in a polymer matrix.

EXAMPLE 16

According to the same method as in Example 15, 0.0033 g (1.0×10$^{-5}$ mol) of potassium tetrachloropalladate (K$_2$PdCl$_4$; 98%), instead of K$_2$PtCl$_4$, was added. All reactions followed the same procedures as described in Example 15. The size of the prepared Pd(II) was in the range of 5 nm~30 nm.

EXAMPLE 17

50 g of chain-end functionalized polymer of molecular weight of 2,500 carrying hydroxyl group, primary amine group or tertiary amine group as synthesized in Example 4, was dissolved in 250 ml of distilled water/tetrahydrofuran (50/50, v/v) mixed solution, followed by addition of 2 mM of aqueous K$_2$PtCl$_4$ solution. 0.04 mM of NaBH$_4$ was added as a reducing agent, and the reaction carried out at room temperature for 6 h. The size of the nano-sized platinum Pt particles as manufactured was in the range of 3 nm~20 nm.

EXAMPLE 18

20 mg of polymer having the tertiary amine group manufactured in Example 4 was dissolved in 250 ml of distilled water/toluene (50/50, v/v) solution in a 500 ml round bottom flask. Next, 3 ml (30 mM) of HAuCl$_4$ solution was added and then 2.5 ml (0.4 M) of NaBH$_4$ solution was added as a reducing agent in the reactor with stirring, followed by standing at room temperature for 24 h. The aqueous fraction of the solution was removed after the reaction was completed and the toluene fraction was washed several times with an excess amount of distilled water. The color of the toluene solution prepared as above was deep red. The solution was precipitated in an excess amount of methanol and filtered. The resulting product was red polymer powder. The size of the nano-sized Au particles in the powder ranged 2 nm~30 mm.

EXAMPLE 19

12 mg (0.066 mM) of palladium chloride ($PdCl_2$) was dissolved in 50 mL (25/25, v/v) mixture of ethanol/distilled water. This salt solution was mixed with a solution made of 12 g (5 mM) of telechelic polymer having a hydroxyl group at the chain end with molecular weight 2,400 synthesized in Example 4, and dissolved in 100 mL of a mixture of ethanol/toluene (50/50, v/v). Reaction was carried out at room temperature for 24 h. The toluene fraction of dark brown solution was washed with distilled water and precipitated in an excess amount of methanol resulting in the production of brown powder. Analysis by TEM revealed the size of palladium (II) metals distributed in a polymer matrix was in the range of 35 nm~150 nm.

EXAMPLE 20

16.2 ml (0.05 mol) of titanium tetraisopropyloxide [Ti(Oi—Pr)$_4$] was dissolved in 30 ml of distilled water with stirring for 1 h, thereby generating white precipitation. The resulting product was washed with an excess amount of distilled water and was put in a 1 L of high pressure reactor (available from Buchi company). 0.06 mol of tetramethylammonium hydroxide [$(CH_3)_4N^+OH^-$] was added to produce a white slurry, and an aqueous alkali solution was added in order to make pH of the solution 8. The temperature in the reactor was maintained at about 130° C. and the solution was stirred for 3~6 h. The color of the solution was very light blue and pH of the solution was about 13. 0.1~1.0 wt % of polymers having sulfonic acid group or carboxyl group prepared in Example 2 were delivered to the slurry in the reactor. The size of $TiO_2$ particles ranged 2 nm~45 nm depending on the concentration of polymers.

EXAMPLE 21

10 g of poly(styrene-b-methyl methacrylate) copolymer (molecular weight: PS=50,000, PMMA=20,000) synthesized in Example 6 was dissolved in 100 ml of toluene, and then 0.01 g of the nano-sized powder prepared in Example 9 was added thereto and stirred for 2 h. The resulting solution was cast on a glass plate to obtain a film. Based on the analysis of the film by electron microscopy, the nano-sized CdS particles were well distributed on the interface of the poly(styrene-b-methyl methacrylate).

EXAMPLE 22

10 g of poly(styrene-b-4-vinylpyridine) copolymer [PS; 10,000, P(4-VPy); 2,500] prepared in Example 6 was dissolved in 50 ml of dimethylsulfoxide. Then, 0.01 g of nano-sized γ-$Fe_2O_3$ particle powder prepared in Example 14 was added and stirred for 4 h. The resulting solution was used for solvent-casting on a glass plate to obtain a film. Based on analysis for the size of particles on the film through electron microscopy, the nano-sized iron dioxide particles were well distributed on the interface of the block copolymer.

EXAMPLE 23

10 g of poly(styrene-b-4-vinylpyridine) block copolymer [PS; 10,000, P(4-VPy); 2,500] synthesized in Example 6 was dissolved in 50 ml of dimethylsulfoxide. Then, 0.01 g of nano-sized Au particle powder prepared in Example 18 was added. A film was made in accordance with the same method as in Example 21 and analyzed. The result showed nano-sized Au particles well distributed on the interface of the block copolymer.

EXAMPLE 24

10 g of poly(styrene-b-methyl methacrylate) copolymer (PS; 20,000, PMMA; 10,000) with molecular weight of 30,000 g/mol carrying tertiary amine group within the chain and hydroxyl group at chain end, was dissolved in 10 ml of a mixture of distilled water/tetrahydrofuran (20/80, v/v). Then, 1 g of cadmium acetate dihydrate [$(CH_3CO_2)_2Cd \cdot 2H_2O$] was added thereto and reacted in accordance with the same method as in Example 8 to obtain a yellow powder. By analyzing the powder through electron microscopy, the nano-sized CdS particles were well distributed on the interface of block copolymer.

The present invention can provide new and simple methods to prepare nano-sized particles capable of easily accomplishing nanostructure by merely mixing, especially with block copolymers, and have excellent stability. Further, the present invention can overcome limitations in uses of conventional nano-sized particles, and can control both concentration and molecular weight of polymers used for stabilizing the nano-sized particles and controlling their size. Additionally, polymers including nano-sized particles stabilized by semi-telechelic polymers can be dissolved in various organic solvents such as benzene, toluene, and tetrahydrofuran. The nano-sized particles prepared by using telechelic polymers are stable for three months or longer even if they are not dissolved in solvents because metals or metal salts act as crosslinking agents.

While the present invention has been described with respect to the particular examples, it will be apparent to those skilled in the art that many changes and modifications may be made without departing from the scope of the invention as defined in the appended claims.

The invention claimed is:

1. Nano-sized metal particles or their salts stabilized by using chain-end functionalized polymer matrices with molecular weight of 1,000~100,000, selected from the group consisting of the following formulas 1~5,

Formula 1

Formula 2 wherein, $R_1$ and $R_2$ are hydrogen and methyl group or t-butyl group; $X_1$ and $Y_1$ are independently carboxyl group, hydroxyl group, sulfonic acid group, or phthalic anhydride group; and n is an integer of 10 to 5,000, Formula 3

Formula 4 wherein, $R_3$ and $R_4$ are hydrogen or methyl group; $X_2$ and $X_3$ are hydroxyl group, carboxyl group, sulfonic acid group, thiol group, amine group, or phthalic anhydride group; and m is an integer of 20 to 10,000, and Formula 5 wherein, $X_4$ is hydroxyl group, amine group; $Y_2$ is hydroxyl group, carboxyl group, sulfonic acid group, or phthalic anhydride group; $A_1$ is a styrenic monomer; $B_1$ is methyl methacrylate, or diene monomer; and, o and p are each an integer of 10 to 5,000.

2. The nano-sized metal particles or their salts of claim 1, wherein the size of metal particles ranges 1 nm~500 nm.

3. The nano-sized metal particles or their salts of claim 1, wherein the metal particles are selected from the group consisting of Au, Ag, Pt (II), Pd (II), CdS, $TiO_2$ and $\gamma$-$Fe_2O_3$ particles.

4. Nano-sized metal particles or their salts, which are stable in air and formed within a matrix of telechelic polymers of the following Formula 6 having molecular weight of 1,000 to 100,000

Formula 6 wherein, $A_2$ is styrenic monomer, methyl methacrylate or diene monomer; n is an integer of 10 to 5,000; and $X_5$ is hydroxyl group, carboxyl group, sulfonic acid group, or phthalic anhydride group.

5. The nano-sized metal particles or their salts of claim 4, wherein the size of metal particles ranges 1 nm~500 nm.

6. The nano-sized metal particles or their salts of claim 4, wherein the metal particles are selected from the group consisting of Au, Ag, Pt (II), Pd (II), CdS, $TiO_2$ and $\gamma$-$Fe_2O_3$ particles.

* * * * *

UNITED STATES PATENT AND TRADEMARK OFFICE
CERTIFICATE OF CORRECTION

PATENT NO. : 7,319,127 B2
APPLICATION NO. : 10/278952
DATED : January 15, 2008
INVENTOR(S) : Kim et al.

It is certified that error appears in the above-identified patent and that said Letters Patent is hereby corrected as shown below:

On the Title Page, Item (73) Assignee should read
-- (73) Assignees: Korea Institute of Science and Technology, Seoul (KR);
Youl Chon Chemical Co., Ltd. Seoul (KR) --.

Signed and Sealed this

Seventeenth Day of June, 2008

JON W. DUDAS
*Director of the United States Patent and Trademark Office*